(12) United States Patent
Lambiaso

(10) Patent No.: US 6,513,756 B1
(45) Date of Patent: Feb. 4, 2003

(54) INSTALLATION OF SINGLE PASSENGER INTERFACE UNIT AND METHOD THEREOF

(75) Inventor: Guy Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/057,289

(22) Filed: Jan. 25, 2002

(51) Int. Cl.$^7$ ................................................. B64C 1/00
(52) U.S. Cl. ..................................... 244/119; 244/118.5
(58) Field of Search .............................. 244/119, 118.1, 244/118.2, 118.5, 118.6; 52/142, 220.1, 220.8, 263, 480

(56) References Cited

U.S. PATENT DOCUMENTS

| | | | | |
|---|---|---|---|---|
| 3,601,341 A | * | 8/1971 | Hertel ......................... | 244/119 |
| 3,938,764 A | * | 2/1976 | McIntyre et al. ......... | 137/68.11 |
| 4,279,109 A | * | 7/1981 | Madl, Jr. .................... | 52/263 |
| 4,596,095 A | * | 6/1986 | Chalfant .................... | 52/126.6 |
| 5,019,672 A | * | 5/1991 | Fish ............................. | 174/48 |
| 5,024,398 A | * | 6/1991 | Reidinger et al. ....... | 244/118.5 |
| 5,085,017 A | * | 2/1992 | Hararat-Tehrani ........ | 244/118.5 |
| RE35,369 E | * | 11/1996 | Ducrous et al. .......... | 52/126.6 |
| 5,827,022 A | * | 10/1998 | Tovani .................... | 244/118.1 |
| 5,927,030 A | * | 7/1999 | Petit et al. ................ | 52/220.1 |
| 5,984,415 A | * | 11/1999 | Schumacher et al. .... | 244/118.5 |
| 6,058,288 A | * | 5/2000 | Reed et al. ................ | 455/3.06 |
| 6,189,283 B1 | * | 2/2001 | Bentley et al. ............ | 52/457 |
| 6,249,913 B1 | * | 6/2001 | Galipeau et al. .......... | 700/295 |
| 6,253,498 B1 | * | 7/2001 | Fanucci ...................... | 52/143 |
| 6,427,945 B1 | * | 8/2002 | Bansemir ................... | 244/119 |

* cited by examiner

Primary Examiner—Charles T. Jordan
Assistant Examiner—Stephen A Holzen
(74) Attorney, Agent, or Firm—Harness, Dickey & Pierce, P.L.C.

(57) ABSTRACT

A passenger interface unit mounted between the floor panel and an outer skin of an aircraft. An aperture is provided in the floor panel and allows installation and removal of the passenger interface unit through the aperture. A cover is detachably connected to the floor panel and over the aperture to secure the passenger interface unit and protect it and passengers in the aircraft from stepping into the aperture. The cover is sized to allow a small gap between the floor panel and the cover to allow cables to pass therethrough. As a result, the passenger interface unit is protected from damage.

17 Claims, 3 Drawing Sheets

INSTALLATION OF SINGLE PASSENGER INTERFACE UNIT AND METHOD THEREOF

FIELD OF THE INVENTION

The present invention relates generally to the installation of single passenger interface unit in the floor area of an aircraft, and more particularly, to the installation of a single passenger interface unit in the floor area of an aircraft that is able to be easily relocated to a different area inside the aircraft.

BACKGROUND OF THE INVENTION

With the advent of the telecommunications and the computer age, individuals are constantly in need of electronic contact with external sources such as telecommunications networks and the internet. This direction is exemplified by the increase and advancement in wireless technology including cell phones, wireless LANs and wireless modems. Such wireless technology allows individuals to communicate with other individuals and connect to computer networks and the internet from remote areas such as inside automobiles, camp sites, and vacation resorts. As a result, individuals are able to perform their jobs and maintain communication while traveling and at locations far outside the office, thereby transforming the traditional brick and mortar office environment into a virtual office space.

While wireless technology is heavily used in land based locations such as land vehicles, it has not as of yet found widespread use in certain types of transportation. Specifically, the use of wireless technology on aircrafts has not been penetrated due to the great distance between the remote computer or cellular device and the cellular hub as well as the restrictions placed upon passengers due to potential interference of the transmitting cellular device with the aircraft's navigation systems. To overcome this, some aircraft manufacturers have provided a single wireless link to allow passengers in the aircraft to connect to a ground based cellular link for connection to a cellular or computer network. While this technological advancement serves to provide adequate transmission power to reach ground based connections and does not interfere with the aircraft's navigational systems, the logistics of properly connecting to a passenger's individual computer still remains to be achieved and refined.

Specifically, network servers or passenger interface units are required to be installed in the aircraft. Each passenger interface unit provides connections for multiple computer users to connect. The passenger interface unit, in turn, communicates with a transmitter/receiver external to the aircraft for transmitting information to and from a ground based link. The passenger interface unit, which is bulky and fragile, must be mounted in a location out of sight and hindrance from the aircraft passengers. Typically, this location is in the side walls of the aircraft. Specifically, the passenger interface unit is placed through a hole in the side wall and mounted to the frame of the aircraft. The hole is then sealed back up while allowing for a small aperture therethrough, which allows a communications cable to be passed to each of a plurality of passenger seats. While this mounting method does serve to adequately mount the passenger interface unit, some drawbacks exist. Specifically, this mounting method requires the presence of large apertures for communication cable to pass through, resulting in an aesthetically unpleasing surface. Moreover, after the passenger interface unit is removed, there remains a hole which must somehow be re-sealed. The present invention was developed in light of these and other drawbacks.

SUMMARY OF THE INVENTION

To address these and other drawbacks, the present invention provides a floor portion in the aircraft that has an aperture in the floor panel and a removable cover. An extension portion extends outwardly from one part of the aperture and the floor cover is positioned over the aperture and detachably affixed to the floor panel. The cover is sized such that it allows a gap to exist between the extension portion and the floor cover for passing a communication cable therethrough.

In another aspect, an aircraft is provided having the floor portion as described above. The cover and floor panel is spaced from an outer skin of the aircraft by a plurality of floor beams. The passenger interface unit is positioned between two adjacent floor beams in the space. The aperture is sized to allow installation and removal of the passenger interface unit when the floor cover is removed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The followings description of the preferred embodiments is merely exemplary in nature and is in no way intended to limit the invention, its application, or uses.

Figure 1:
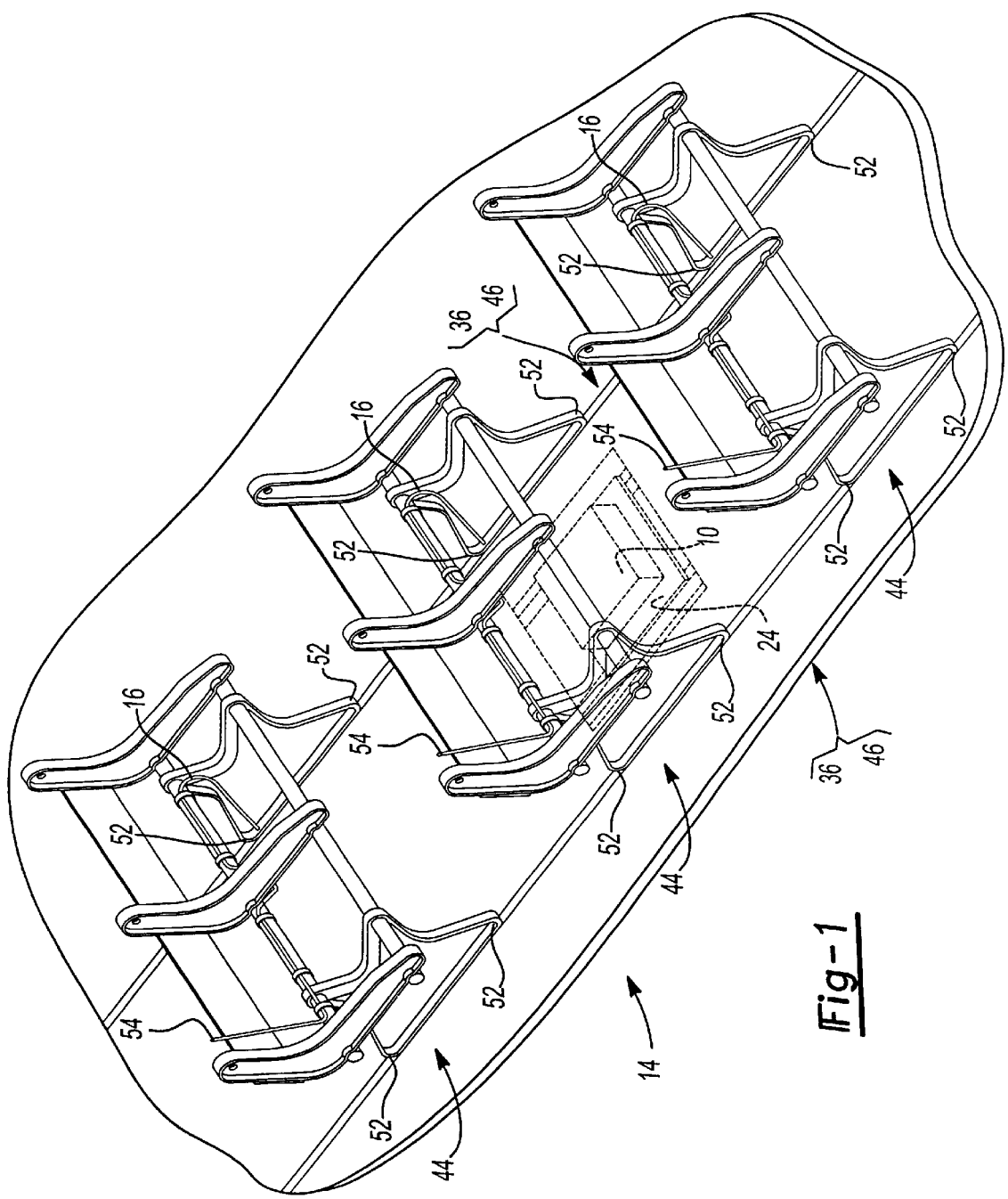
FIG. 1 is a perspective view of a seating arrangement and passenger interface unit installed according to the present invention.
Figure 2:
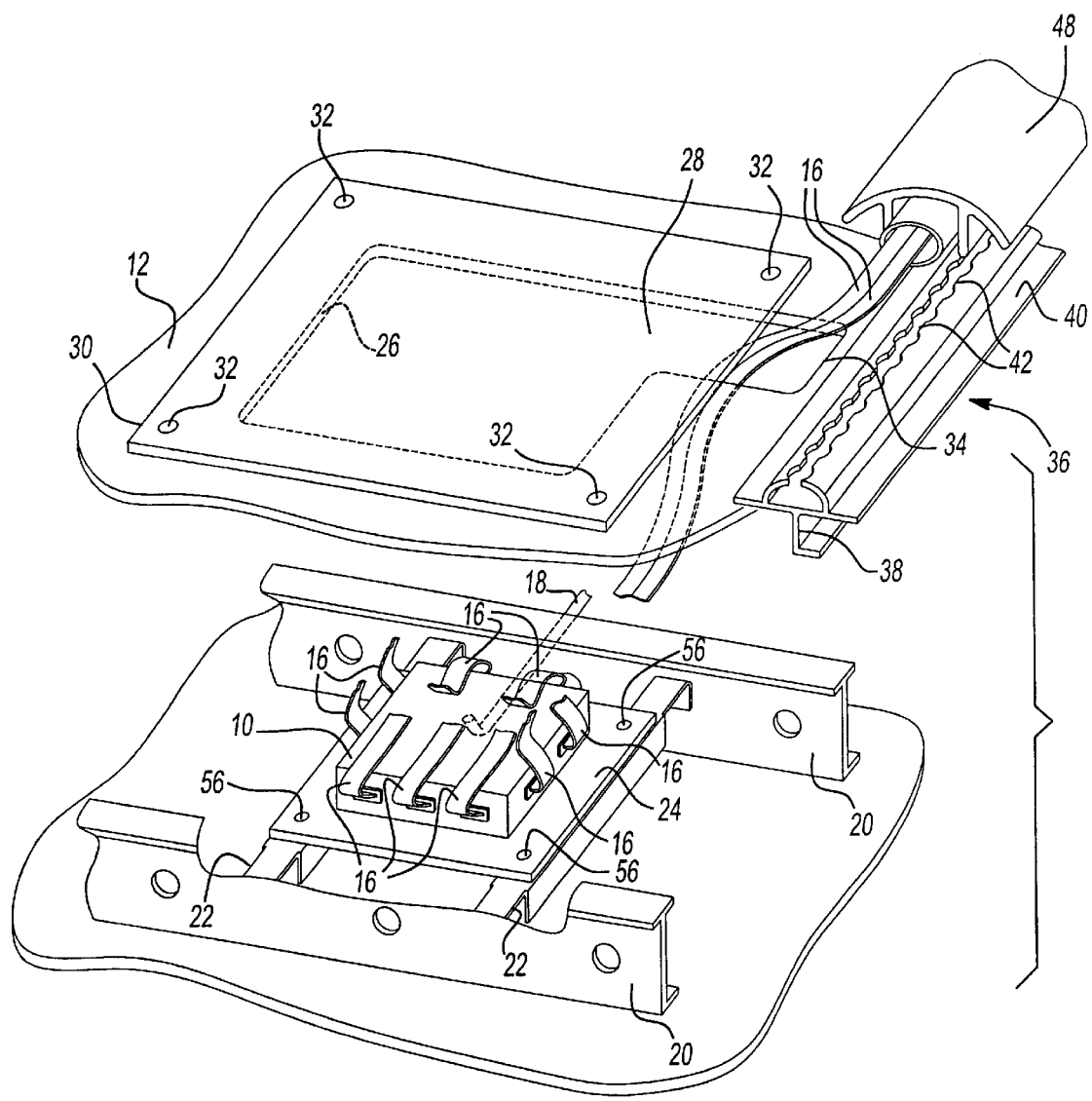
FIG. 2 is an exploded perspective view of a passenger interface unit installed under a floor portion according to the present invention.

Referring now to FIGS. 1 and 2, a passenger interface unit 10 is shown mounted under a floor panel 12 in an aircraft 14. Passenger interface unit is a computer server having nine communication cables 16. Communication cables 16 comprise electrical or fiber optic cables designed to transmit and receive information between passenger interface unit 10 and a passenger's computer situated within the aircraft 14. Passenger interface unit 10 is preferably rectangular in shape having two ports on each of three out of four sides and three ports on a fourth side to connect to connection 16. It Will be appreciated, however, that other shapes could easily be implemented, and that the interface unit 10 should not be construed as being limited to a rectangular shape. Output line 18 connects passenger interface unit 10 with an external transmission/reception device for transmitting and receiving information between the passenger interface unit 10 and an external ground unit.

Passenger interface unit 10 is supported between floor beams 20 by intercostal supports 22 and support plate 24.

Floor beams 20 act to structurally reinforce aircraft 14 and support floor panel 12 as well as seats supported thereon.

Aperture 26 is formed in floor panel 12 to allow positioning and retrieval of passenger interface unit 10. As such, aperture 26 is generally rectangular in shape and further has extension portions 28 positioned to one corner area of aperture 26. Floor cover 30 covers aperture 26 and is generally rectangular in shape with a cross sectional area sufficiently larger than aperture 26 to ensure that a majority of aperture 26 is covered. For securing floor cover 30 to floor panel 12, a plurality of fastener apertures 32 are located at opposite corners of floor cover 30. As such, fasteners such as bolts, screws and the like can be passed through each aperture 32 and into floor panel 12 to secure floor cover 30 to floor panel 12. Floor cover 30 is also sized to cover most of extension portion 28 but allows a small exit area 34 to be exposed for passing cables 16 to an area above the floor panel 12.

Seat track 36 is supported by floor panel 12 by support 38. Seat track 36 has an upper flat portion 40 that forms a T-shape with support 38 to vertically and horizontally reinforce seat track 36 from movement. In seat track 36 is positioned a plurality of apertures 42 that fit pins 52 from aircraft seats 44 (see FIG. 1). Seat track cover 46 has a cover area 48 and a base portion 50. Cover area 48 and base portion 50 form a T-shape, wherein base portion 50 fits down within apertures 42 to support cover area 48 above and over upper flat portion 40. As such, the locations occupied by pins 52 from seats 44 are exposed. However where pins 52 from seats 44 do not occupy apertures 42, cover area 48 effectively covers seat track 36 to protect it from damage and also for aesthetic reasons.

As shown in FIG. 1, seat track 36 and seat track 46 extend along opposite sides of seats 44 lengthwise within aircraft 14. The pins 52 extend vertically downward into apertures 42 to support each of seats 44. The plurality of cable 16 form a cable bundle 16a that travels under cover area 48 and along the support structure of seats 44 until terminating at a user connection area 54. The user connection area 54 can be an RJ-46 unit, parallel port connection, serial port connection, or any other type of connection known in the art for coupling to a computing device of the user.

Referring again to FIGS. 1 and 2, the assembly and installation of passenger interface unit 10 into aircraft 14 is shown as described. During assembly, aperture 26 is formed in floor panel 12. Next, intercostals 22 are arranged in the parallel arrangement as shown in FIG. 2 and attached at opposite ends to floor beams 20. Support plate 24 is then attached at opposite edges to intercostals supports 22 by fasteners 56. Each of these elements is dropped through aperture 26 to be positioned therein. Next, passenger interface unit is placed face down on support plate 24 and attached thereto by screws or other fastening means. Cables 16 and output line 18 are plugged into respective ports on passenger interface unit 10. Cables 16 are then bundled together to form bundle 16a and are positioned into extension portion 28. Floor cover 30 is next placed over aperture 26 and attached to floor panel 12 by fasteners threaded through fastener apertures 32 and into floor panel 12. This further acts to lock portions of cables 16 extending outward through extension portion 28 between floor cover 30 and aperture 26. Cable bundle 16a, formed from cable 16, is passed between upper flat portion 40 and cover area 48 to allow connection 16 to each cable thereof to be passed through a seat frame of a respective seat 44. As shown in FIG. 1, each seat 44 has a respective cable 16 that originates at passenger interface unit 10, passes between cover area 48 and upper flat portion 40 and terminates at a respective seat 44.

During the removal process, floor panel 30 is removed by removing fasteners through fastener apertures 32. The cover is then lifted off the aperture 26 to allow access to passenger interface unit 10, support plate 24 and intercostal supports 22. Interface unit 10 is then removed by removing the fastener securing it to support plate 24 and then passed through aperture 26 to the interior of the aircraft 14. Next, floor cover 30 is again placed over aperture 26 and secured to floor panel 12 by fasteners passing through fastener apertures 32. This ensures that aperture 26 does not remain open to the internal environment of the aircraft 14, thereby preventing a passenger from inadvertently stepping through the aperture and injuring themselves. Passenger interface unit 10 can then be relocated to another part of the aircraft 14 by repeating the procedure as described previously at the other part of the aircraft.

Figure 3:
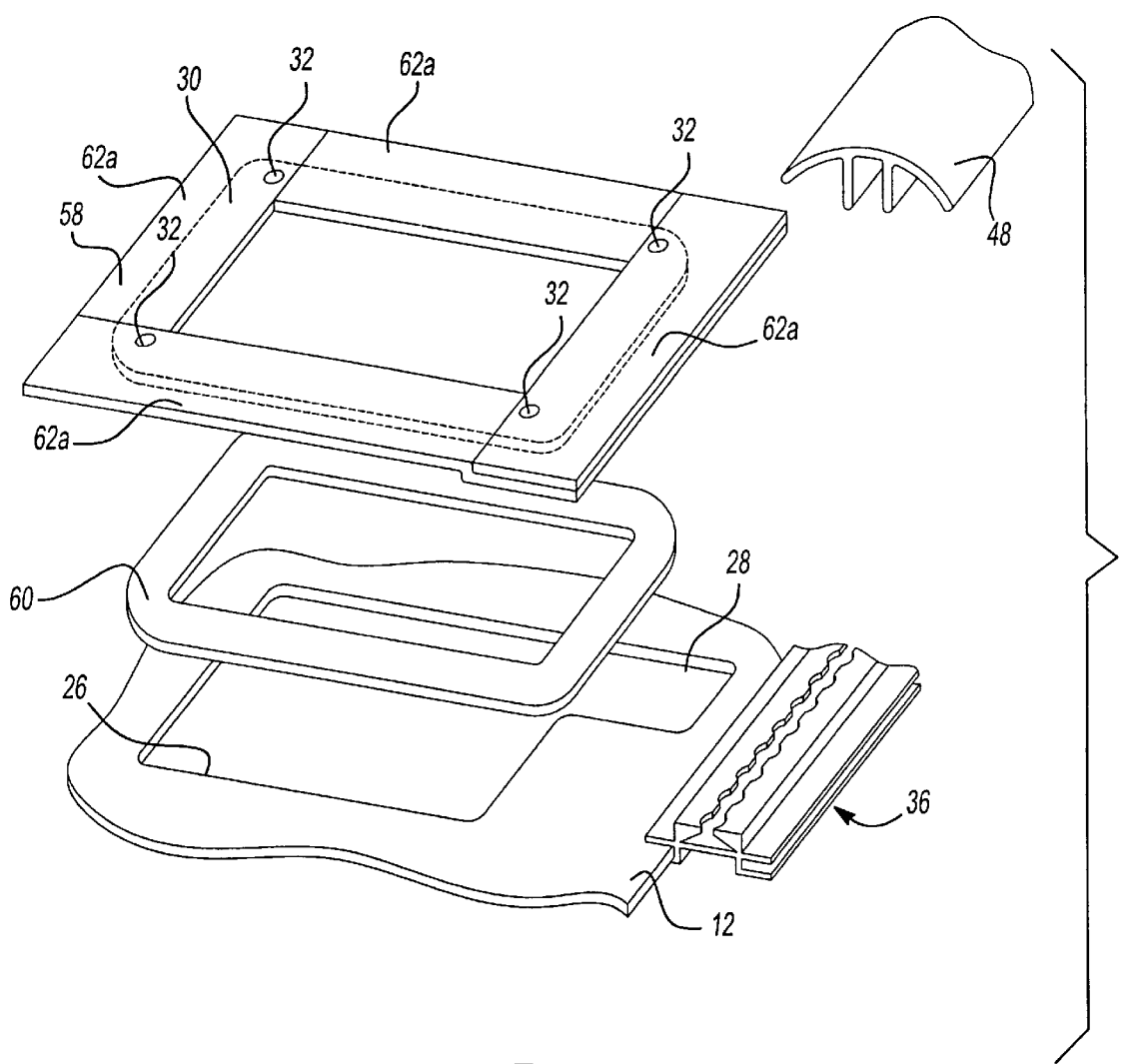
FIG. 3 is an exploded perspective view of a second floor cover covering an aperture in a floor panel according to the present invention.

Referring now to FIG. 3, a device for sealing aperture 26 after passenger interface unit 10 has been removed by the process described previously is shown and described. In FIG. 3, when passenger interface unit 10 is no longer positioned under floor panel 12, secondary floor cover 58 is used to seal areas around floor cover 30 including extension portion 28. The process for accomplishing this is described with continued reference to FIG. 3. First, after floor cover 36 has been removed allowing the removal of passenger interface unit 10, cover area 48 is removed from seat track 36. Next, seal 60 is positioned down around the perimeter of aperture 26. Floor cover 30 is then reattached to floor panel 12 via fasteners passed through fastener apertures 32. As such, after floor cover 30 is attached to floor panel 12, seal 60 sits around the outer perimeter of floor cover 30. It is noted that floor cover 30 can be first attached to floor panel 12 with seal 60 positioned afterwards. With only floor cover 30 attached to floor panel 12, the part of extension portion 28 that previously allowed connections 16 to pass from the passenger interface unit 10 to the internal environment of the aircraft 14 is still exposed. To cover this opening, secondary floor cover 58 is next attached over the remaining open area. For this attachment, pieces of double back tape 62a are placed on the downward side and outer periphery in a rectangular configuration on secondary floor cover 58. Next, secondary floor cover 58 is pressed downward on top of floor cover 30, seal 60 and floor panel 12 to secure secondary floor cover 58 to floor panel 12. As secondary floor cover 58 is larger than floor cover 30, the entire aperture 26, including extension portion 28, is completely covered. Moreover, seal 60 prevents leakage between secondary floor cover 58 and floor panel 12. Next, cover area 48 is reattached to seat track 36.

As a result of the above described installation, a passenger interface unit can be repositioned throughout aircraft 14 when desired without requiring major construction or leaving aesthetically unpleasing holes in portions of the aircraft where the passenger interface unit previously resided. Moreover, the previous location of passenger interface unit 10 can be completely sealed, thereby prohibiting injury to passengers and damage to the aircraft due to passengers potentially stepping through holes in the floor board.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A floor portion of an aircraft for supporting passengers and passenger seating, the floor portion comprising:
a floor panel having an aperture for passing a passenger interface unit, the floor panel having an extension portion extending from an outer periphery of the aperture;

a floor cover covering the aperture and a portion of the extension portion;

wherein the floor panel leaves a second portion of the extension portion open to a sufficient area for allowing a plurality of cables to pass from a lower side of the floor panel to an upper side of the floor panel.

2. The floor portion as claimed in claim 1, wherein the aperture is substantially rectangular shaped.

3. The floor portion as claimed in claim 2, wherein the extension portion is rectangular shaped and extends outward from a corner of the aperture.

4. The floor portion as claimed in claim 3, wherein the floor cover is substantially rectangular shaped, wherein a cross sectional area of the floor panel is larger than a cross sectional area of the aperture.

5. The floor portion as claimed in claim 4, wherein the floor cover has fasteners passing through corners of the floor cover that secure the floor cover to the floor panel.

6. The floor portion as claimed in claim 5, further comprising:

a second floor cover positioned over the floor cover, the second floor cover having a larger cross sectional area than at the floor clover, the second floor cover covering the second portion of the extension portion.

7. The floor portion as claimed in claim 6, further comprising a seal positioned between the second floor cover and the floor panel.

8. The floor portion as claimed in claim 7, further comprising double back tape adhered to a bottom surface of the second floor cover for adhering the second floor cover to the floor panel.

9. An aircraft comprising:

a floor portion comprising:
  a floor panel having an aperture;
  a floor cover affixed to an upper surface of the floor panel, the floor cover covering a first portion of the aperture and leaving a second portion of the aperture open;
an outer skin;
a plurality of floor beams separating the floor portion from the outer skin;
a passenger interface unit supported between the floor portion, outer skin, and to adjacent floor beams of the plurality of floor beams; and
wherein the aperture is sized large enough to allow passenger interface unit to pass therethrough.

10. The aircraft as claimed in claim 9, further comprising a plurality of cables passing through the second portion of the aperture, the cables originating at the passenger interface unit.

11. The aircraft as claimed in claim 10, further comprising:

a seat track mounted in the floor panel, the seat track having an upper surface;

a cover area disposed on top of and detachably affixed to the upper surface of the seat track, the cover area covering substantially all of the upper surface of the seat track; and wherein the cables pass from the second portion of the aperture into an area between the cover area and the upper surface of the seat track.

12. The aircraft as claimed in claim 11, further comprising a plurality of seats, each of the plurality of seats detachably connected to respective areas along the seat track at positions where the cover area does not cover the upper surface of the seat track.

13. The aircraft as claimed in claim 12, wherein each one of the cables extends from a position under the cover area to a respective seat.

14. The aircraft as claimed in claim 13, wherein each of the cables terminates at a computer connection.

15. The aircraft as claimed in claim 14, wherein the computer connection comprises an RJ-46 connection.

16. The aircraft as claimed in claim 14, wherein the computer connection comprises a parallel port connection.

17. The aircraft as claimed in claim 14, wherein the computer connection comprises a serial port connection.

* * * * *